L. M. COLMAN.
EYEGLASSES.
APPLICATION FILED SEPT. 6, 1919.

1,359,576.

Patented Nov. 23, 1920.

Inventor:
Lulu M. Colman,
by Spear, Middleton, Donaldson & Hall
Atty's.

UNITED STATES PATENT OFFICE.

LULU M. COLMAN, OF CHAPPELL, NEBRASKA.

EYEGLASSES.

1,359,576.  Specification of Letters Patent.  Patented Nov. 23, 1920.

Application filed September 6, 1919. Serial No. 322,116.

*To all whom it may concern:*

Be it known that I, LULU M. COLMAN, a citizen of the United States, and resident of Chappell, Nebraska, have invented certain new and useful Improvements in Eyeglasses, of which the following is a specification.

My invention is an improvement upon spectacles or eye glasses having mirrors combined therewith for the purpose of reflecting the images of objects or persons located to one side or in rear of the wearer.

Such mirrors as used heretofore have been carried by a part of the frame either in fixed relation thereto or capable of movement or adjustment about a pivot bearing, these constructions being more or less expensive and cumbersome and not adapted to the particular needs of the user whose eyes may be of such a character as to require a mirror of special formation or location in relation to the main glass.

I aim to provide such a combination of eye glass and mirror that the ordinary field of vision will not be obstructed or interfered with, the user not being conscious of its presence while using the main lenses in the ordinary manner, but the mirror is instantly available for use by the user directing his line of vision slightly to one side.

The invention is shown in the accompanying drawing in which.

In carrying out the invention I insert into the ordinary lenses 1 small mirrors as shown at 2. These may be used with rimless glasses or with glasses having frames holding the lenses. These mirrors are located off to one side of the center of the main lenses and they take up no more room than the main lens, being inserted so as to be flush therewith. These mirrors are small as compared with the main lenses and are not conspicuous. They will be ground to conform to the special requirements of the eyes of the persons for whom they are intended just as the main lenses are ground to suit the user's particular needs and they form substantially integral continuations of the main lenses.

If desired the frame may be provided with portions shown at *x* forming an outer covering or backing for the mirrors. Instead of uniting the mirror with the lens by inserting it in the body thereof, I may employ a clip to hold it in place, so that the mirror may be slipped on or off at will.

In referring to the mirror as an insert into the main lens it will be understood that this construction can be carried out by forming a recess in the main lens and placing the mirror therein, the recess being of less depth than the thickness of the lens, or, the mirror can be of the same thickness as the main lens.

The mirror may be of the same color as the color of the main lens for instance amber glasses used for automobiling or other purposes may have amber colored mirrors.

Figure 1:
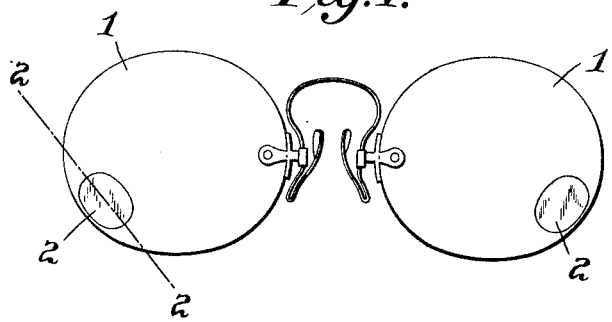
Figure 1 is an elevation of a pair of eye glasses embodying my invention.
Figure 2:
Fig. 2 is a sectional view on the line 2—2 of Fig. 1 showing the mirror inserted in a recess of the main glass.
Figure 3:
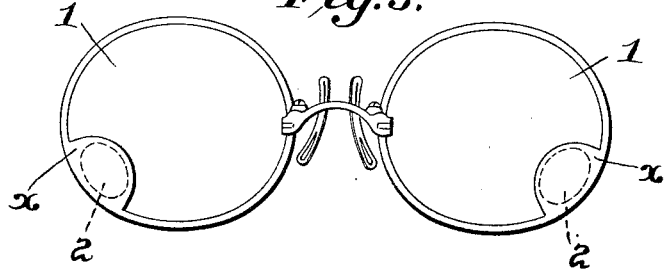
Fig 3 is an elevation of a pair of eye glasses having a frame, a portion of which extends over the back of the mirror and serves to protect the same.
Figure 4:
Fig. 4 is an edge view of an eye glass showing a mirror held thereto by a clip.
Figure 5:
Fig. 5 is a view of another form of glass showing the mirror forming an extension of one end of the glass.

Again instead of affixing the mirror in a recess of the main lens it may be formed of a section or extension of the main lens at the edge thereof and this may be an integral portion of the lens or a piece added thereto as indicated in Fig. 3 and to protect this extension the frame may have a portion to overlie the same on the rear side of the mirror. In each of the above forms the face of the mirror will be ground flush with face of the lens.

The mirrors may be inserted within the front or rear of the lens.

I claim:

Eye glasses having mirrors inserted in the lenses within the circuit of the edge thereof, and a frame having portions overlying the backs of the mirrors and consequently lying within the general shape of the lens, substantially as described.

In testimony whereof I affix my signature.

(MRS.) LULU M. COLMAN.